April 17, 1962 L. C. YOUNG 3,029,600
VARIABLE SUPERSONIC INLET AND BY-PASS SYSTEM
Filed July 2, 1956 5 Sheets-Sheet 1

INVENTOR.
LOUIS C. YOUNG
BY
William L. Lane
ATTORNEY

INVENTOR.
LOUIS C. YOUNG

BY William P. Lane
ATTORNEY

April 17, 1962 L. C. YOUNG 3,029,600
VARIABLE SUPERSONIC INLET AND BY-PASS SYSTEM
Filed July 2, 1956 5 Sheets-Sheet 4

INVENTOR.
LOUIS C. YOUNG
BY
*William R. Lane*
ATTORNEY

April 17, 1962

L. C. YOUNG 3,029,600

VARIABLE SUPERSONIC INLET AND BY-PASS SYSTEM

Filed July 2, 1956

INVENTOR.
LOUIS C. YOUNG

BY

*William R. Lane*

ATTORNEY

United States Patent Office 3,029,600
Patented Apr. 17, 1962

3,029,600
VARIABLE SUPERSONIC INLET AND
BY-PASS SYSTEM
Louis C. Young, Gardena, Calif., assignor to
North American Aviation, Inc.
Filed July 2, 1956, Ser. No. 595,287
5 Claims. (Cl. 60—35.6)

This invention relates to a ram-air inlet, and in particular relates to a high performance two-dimensional supersonic engine-air inlet system that realizes high inlet pressure recovery through the use of a variable wedge compression surface in the inlet in conjunction with a by-pass outlet for proper matching of the inlet air mass flow rate to the engine air demand.

In turbo-jet and ram-jet engines the thrust available is a function of the weight-rate of air flow to the engine. This weight-rate of air flow to the engine is, in turn, a function of the total pressure of the air in the duct leading to the engine. Air cannot be decelerated from supersonic to subsonic speeds without passing through a flow discontinuity known as a shock wave, with a resultant loss in total pressure. Thus for effective supersonic operation of turbo-jet and ram-jet engines it is important that the best possible total pressure recovery be achieved in the inlet of the engine duct. The magnitude of the total pressure loss is a function of the strength of the shock and varies from a minimum value for small pressure changes through an oblique shock wave to a maximum value for the case of the normal shock wave. Thus one or more oblique shock fronts may be created ahead of the normal shock front and the air velocity changed at these fronts from a higher to a lower supersonic velocity with a consequent improvement in the pressure recovery ratio; since the loss in total pressure through a normal compression shock wave as compared to the loss through an oblique shock wave is relatively high and increases with an increase in Mach number.

In order to create a system of oblique shock waves preceding the terminal normal shock wave at the opening of an inlet, it is necessary to have a projecting sharp edge, wedge, or ramp ahead of the inlet for initiation of such an oblique shock front. Additional oblique shock fronts may also be set up at points of discontinuity or "corners" along such a projecting wedge or ramp rearwardly from the initial oblique shock front. The optimum inlet recovery is dependent upon the inlet ramp angle; while the optimum ramp angle is a function of flight Mach number and the effective angle of attack or yaw of the inlet.

In addition to total pressure recovery, one of the most important factors affecting the performance of supersonic ram-jet or turbo-jet powered aircraft is inlet-engine matching. This means equivalency or matching of the engine-air mass-flow demand with the air mass-flow supplied by the inlet at any particular instant under a particular set of entrance conditions. The air mass-flow supplied by a variable ramp type inlet is a function of the Mach number, ramp angle, and the effective angle of attack at the ramp. These are the same factors determinative of the amount of pressure recovery attained. At low mass flows a condition of inlet instability known as "buzz" may be encountered, with this inlet instability decreasing rapidly above 1.5 Mach number. The engine-air mass-flow demand on the inlet is a function of the airflow characteristics of the particular engine, engine speed, ambient temperature and the air demand of accessory equipment using air bled from the inlet duct.

In order to obtain the maximum inlet pressure recovery consistent with minimum spillage drag and to insure inlet stability, a by-pass system is required in some engine installations. Such a system allows the excess air capacity of the inlet to be discharged from the inlet duct at sonic speed. Some engines incorporate an ejector type nozzle and the secondary air supply for the nozzle can be controlled to optimize inlet-engine matching.

Generally the present invention contemplates an air inlet comprising an air pressure sensing system for controlling a variable ramp compression surface to achieve the optimum pressure recovery thereon and for adjusting the flow of bypass air to maintain the normal shock front between predetermined limits for efficient inlet-engine matching.

Accordingly it is an object of the present invention to provide efficient matching of the air demand of a jet-type engine to the inlet-air mass rate of flow.

It is also an object of the present invention to provide a means for adjusting a two-dimensional air-inlet variable ramp to insure optimum pressure recovery in the inlet.

It is another object of the present invention to reduce the spillage drag at the inlet to a minimum and to insure inlet stability.

It is a further object of this invention to maintain a constant ratio of the static pressure on a variable compression ramp to the total pressure of the airstream as measured at a remote location.

It is a still further object of the present invention to provide a by-pass mechanism to maintain the inlet normal shock front within predetermined limits at the inlet.

Still a further object of this invention is to porvide a system for efficiently controlling an inlet for supersonic ram air in conformance with engine requirements for achieving optimum performance of the engine.

These and other objects and advantages of the present invention will become apparent to those skilled in the art after reading the present specification and the accompanying drawings forming a part thereof, in which.

Figure 2:
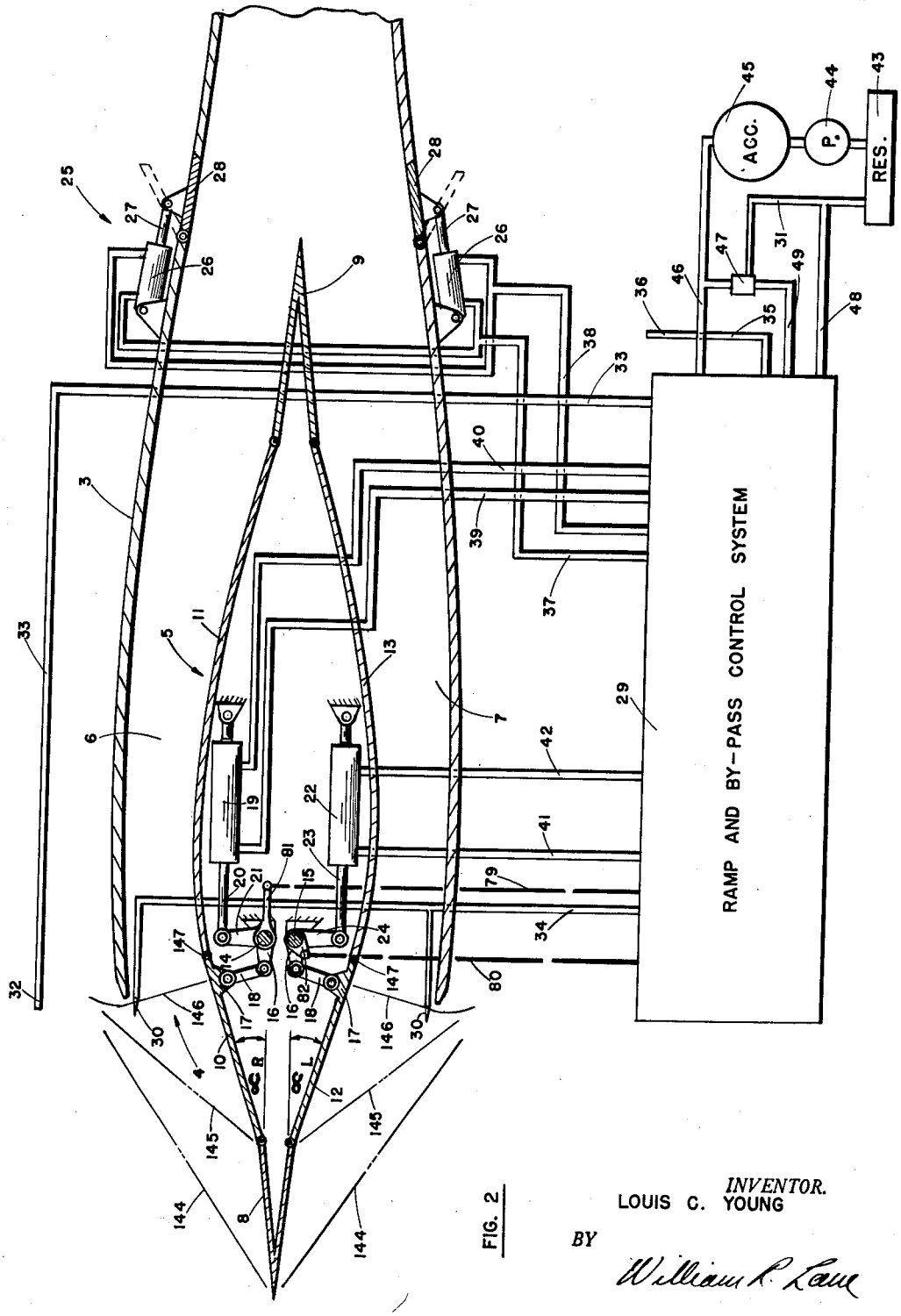
FIG. 2 is a diagrammatic view, partly in section, of the variable ramp and by-pass system of this invention illustrating the actuating and control system in a simplified form with the variable ramps in their expanded or outermost position.

Referring specifically to the drawings, wherein like reference characters have been used throughout the several views to designate like parts, and referring at first to the embodiment of FIG. 2, reference numeral 3 generally designates a combustion air intake duct or conduit, for a turbo-jet powered missile or aircraft 1, which extends generally rearwardly from a frontal air inlet 4 to the engine. While the power plant herein is designated as being of the turbo-jet type, the invention has equally important application to ram-jet power systems wherein a high pressure recovery ratio is of fundamental importance to operation and the by-pass system can be controlled to match the inlet air supply and engine air demand to prevent flow instability and to give efficient engine operation.

Due to the high loss in total pressure occurring across a normal shock wave when a high Mach number supersonic airflow is slowed to subsonic flow, it is desirable to first slow the supersonic flow to a lower Mach number by means of a supersonic diffuser before passing it through the normal shock front. This can best be accomplished for a two-dimensional type inlet by the introduction of a pointed or sharp-edged wedge-like body into the airstream for creating one or more oblique shock waves ahead of the normal shock wave at the entrance to the inlet whereby the airflow will be slowed to a lower Mach number. Accordingly a splitter wedge 5 is provided centrally in the conduit 3 for creating an initial oblique shock wave 144. Wedge 5 extends the full height of the conduit and divides it into a symmetrical right hand duct 6 and left hand duct 7 in the forward portion of conduit 3.

Wedge 5 is comprised of a fixed diverging forward wedge portion 8 having a total enclosed angle of approximately 12° projecting a predetermined distance ahead of the inlet and a converging rearward wedge portion 9 positioned a spaced longitudinal distance aft of wedge portion 8. Intermediately located between the hinged rearward edge of forward wedge portion 8 and the hinged forward edge of rear wedge portion 9 on the right side, are two movable right ramp portions 10 and 11. Forward movable ramp portion 10 is hinge-connected to wedge portion 8 at the front end and to the front edge of the rearward movable ramp portion 11 at the other end. Ramp portion 11 in turn is hingedly connected to rear wedge portion 9. Movable ramp portions 12 and 13 are similarly hinge-connected to form the left side of wedge 5. Movable ramps 10, 11 and 12, 13 comprise compression surfaces that can be moved laterally inwardly or outwardly to form, with the fixed walls of conduit 3, a variable throat area in each of the separate ducts 6 and 7. The movable ramps 10 and 12 in the illustrated embodiment have a total enclosed angle varying between the limits of 6½ degrees when retracted and 44 degrees when fully extended. The exact degree of angularity required is a matter of design based on the particular characteristics and functions required of a particular installation. By suitable manipulation of ramps 10 and 12, in conformance with variations in Mach number of the aircraft, the wedge angles $\alpha_R$ and $\alpha_L$ of the ramps may be changed to vary the inlet throat area and the oblique shock angles to achieve the optimum total pressure recovery. The forward ends of rearward ramps 11 and 13 follow the movements of the forward ramps 10 and 12, to which they are attached, and with the walls of conduit 3 the rearward portions of ramps 11 and 13 form generally diverging subsonic diffuser sections in the separate ducts 6 and 7.

The hinge 147 joining ramp 10 to ramp 11 and ramp 12 to ramp 13 is of a type permitting free lateral movement of the ends of the ramps in a manner to allow expansion or contraction of the inlet duct throat area while maintaining a substantially smooth uninterrupted boundary surface.

In normal operation movable forward ramps 10 and 12 diverge angularly outwardly from the divergent sides of fixed nose wedge 8. This line of juncture discontinuity creates a second oblique compression shock wave 145 of the "corner" type behind the initial oblique shock front created at the front of nose wedge 8. The strength of this second oblique shock front is a function of the variable relative angle between the movable forward ramps 10 and 12 and the diverging surfaces of fixed wedge 8 and it increases in strength with an increase in divergence of the movable ramps 10 and 12, or as the deflection angle between the adjoining surfaces increases. Thus one of the primary purposes of splitter wedge 5 is a lowering of the airstream Mach number to a point close to but still greater than Mach 1 in order to reduce the strength of the normal shock wave and minimize pressure losses through the normal shock front 146.

Located within the splitter wedge are two substantially vertically positioned ramp actuating shafts 14 and 15, for operation of the right and left ramps respectively. Shafts 14 and 15 are suitably supported and journaled, in a manner not shown, for limited rotational movement about their vertical longitudinal axes and have one or more rigidly mounted crank arms 16, each connected to a bracket 17 fixedly mounted on the inner surface of one of the movable ramp portions 10, 12 by a pin connected link 18. Upon rotation shaft 14 moves right ramp 10 laterally in or out about its forward hinged end by means of crank 16 and link 18. Shaft 15 similarly operates left ramp 12 but the ramp connecting linkage is positioned to operate ramp 12 180 degrees out of phase with ramp 10 when shafts 14 and 15 are both rotated in the same direction. Therefore to produce equal movement of the movable ramps in opposite directions, shafts 14 and 15 must be rotated in opposite directions at the same time to produce simultaneous symmetrical contraction or expansion of the throats of the separate ducts 6 and 7. Right shaft 14 is actuated by a double-acting hydraulic actuator 19, which is pivotally attached at one end to rigid supporting structure of the aircraft and has a reciprocable piston therein with a piston rod 20 pin-connected to a crank 21 rigidly attached to the lower end of shaft 14. Left shaft 15 is similarly actuated by a double-acting hydraulic actuator 22 having a reciprocable piston rod 23 pin-connected to a crank 24 which is rigidly attached to the lower end of shaft 15.

In the device as disclosed herein the air inlet is located on an upper surface of the supporting aircraft structure and the lower end of each of shafts 14 and 15 are extended into such supporting structure for connection to the actuating cylinders which are pivotally mounted on stationary supporting structure within the fuselage or missile body below conduit 3. Other portions of the control system, to be described below, are also conveniently positioned in such supporting structure. It is obvious, however, that the air intake structure of this invention is not limited to the exact installation shown or described herein. Such an installation is equally adaptable for suspension from a body, such as a fuselage or wing, and such an installation is shown and described below in a second embodiment. Various other arrangements of the linkage and operating device can also obviously be utilized to effectively actuate the ramps other than the specific mechanism described herein.

An air by-pass mechanism forms an integral part of the present system for controlling the inlet air to achieve optimum operating conditions. In order to eliminate drag due to the spillage of air around the edges of the inlet duct, which occurs under certain low mass flow conditions, all of the air within the "capture area" of the inlet must be able to enter the duct. If the engine-air mass flow demand rate is less than the inlet-air mass flow supply rate at any particular instant, the normal shock wave will be detached ahead of the inlet, as shown in FIG. 2, and spillage of the excess air around the edges of the inlet will take place at subsonic speeds with a resultant increase in drag. At low mass flow rates a condition of inlet instability may occur wherein the inlet-air mass flow and the normal shock location oscillate rapidly in the inlet conduit. Such inlet instability can create a resonance condition in the air duct that may damage or destroy portions of the aircraft or engine, such as compressor blades and the like. Thus the purpose of the by-pass control mechanism is to provide efficient inlet-engine matching so as to reduce spillage drag to a minimum and also to provide a means for insuring stability of the air inlet system. This device controls the air mass-flow-rate in the duct to the engine by providing a door or flap means for bleeding the excess air capacity of the inlet from the conduit 3 at a point intermediate the inlet and the engine and discharging it overboard at sonic speed or utilizing it for auxiliary purposes.

As shown in FIG. 2, the by-pass actuating mechanism 25 comprises a plurality of double-acting cylinders 26 having reciprocable pistons therein and piston rods 27 pivotally connected to discharge doors or flaps 28 located in the wall of conduit 3. Doors 28 are hinged for pivotal movement to open upon retraction of the piston rods 27 into the cylinders thereby establishing communication between the interior of conduit 3 and the ambient atmosphere to allow discharge of the excess inlet air. The open position of the by-pass discharge doors is shown by the broken lines on FIG. 2.

The control system for the variable ramps and by-pass doors, as illustrated and described herein, comprises a mechanical-hydraulic device operable in response to changes in the inlet flow conditions as sensed by pneumatic probe means. The control system is generally indicated on FIG. 2 by reference numeral 29.

The angles of the variable ramps of the two embodiments described herein are individually adjustable in response to a change in Mach number as measured by the ratio of the freestream total pressure, measured behind a normal shock wave by an airspeed boom, to either the static pressure on the variable ramps or to the ambient static pressure. The ramp angles are adjusted in unison to maintain a constant ratio of such total pressure to static pressure. In the embodiment of FIG. 2 ambient static pressure is used while in the embodiment of FIG. 6 the static pressure is measured at the ramp. In the embodiment of FIG. 2 the total pressure is measured by an airspeed boom or pitot tube 32 projecting forwardly of the upper edge of fixed forward wedge 8, and the total included ramp angle for a given Mach number is a constant.

Figure 9:
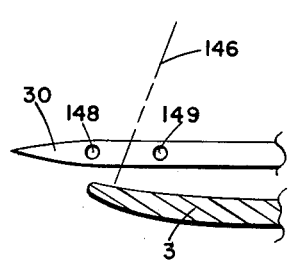
FIG. 9 is a diagrammatic view, on an enlarged scale, of one of the shock sensing probes of FIG. 2 located at the intake cowl and showing the normal shock wave located in its normal controlled position between the two static pressure sensing taps.

The by-pass portion of control system 29 senses a shock pressure due to the normal shock wave by means of static pressure sensing taps 148 and 149 at two predetermined points in the inlet and adjusts the by-pass airflow to maintain the normal shock between the same two points, which are located at the limits of the desired range of normal shock travel, see FIG. 9. These pressure pickup points may be located on the ramp as shown at 176, 177 in the embodiment of FIG. 6, on the cowl at 30 as in the embodiment of FIG. 2, or may be suitably positioned elsewhere in the inlet. Instead of using separate static pressure pickup points on different sides of the normal shock front, for the cowl type probe or rake, it has been found to be advantageous in some installations to use a slotted probe extending through the shock front whereby an automatic pressure integration across the shock wave is obtained. If the strength of the normal shock is constant, the sensed shock pressure is a function of the position of the normal shock front relative to the pressure pickup points.

As further shown in FIG. 2, in addition to the pneumatic sensing conduits 33, 34 and 35 which communicate with the control system 29 from total pressure probe 32, shock sensing probe 30, and ambient static pressure pickup 36 respectively, hydraulic operating fluid is alternatively supplied to and returned from the by-pass actuator cylinders 26 by conduits 37 and 38. Conduits 39, 40 and 41, 42 provide communication between right and left ramp actuating cylinders 19 and 21 respectively and the control system 29 for the supply and return of working fluid to and from the double-acting hydraulic actuators.

Hydraulic fluid is supplied to system 29 by a conventional closed hydraulic system comprising in series hydraulic return line 48, reservoir 43, pump 44, accumulator 45, high pressure conduit line 46, pressure regulator 47 for reducing a portion of the high pressure hydraulic fluid to a lower working pressure, and conduit 49 supplying the low pressure hydraulic fluid to the control system. Conduit 31 is a by-pass line from regulator 47 to reservoir 43.

Figure 3:
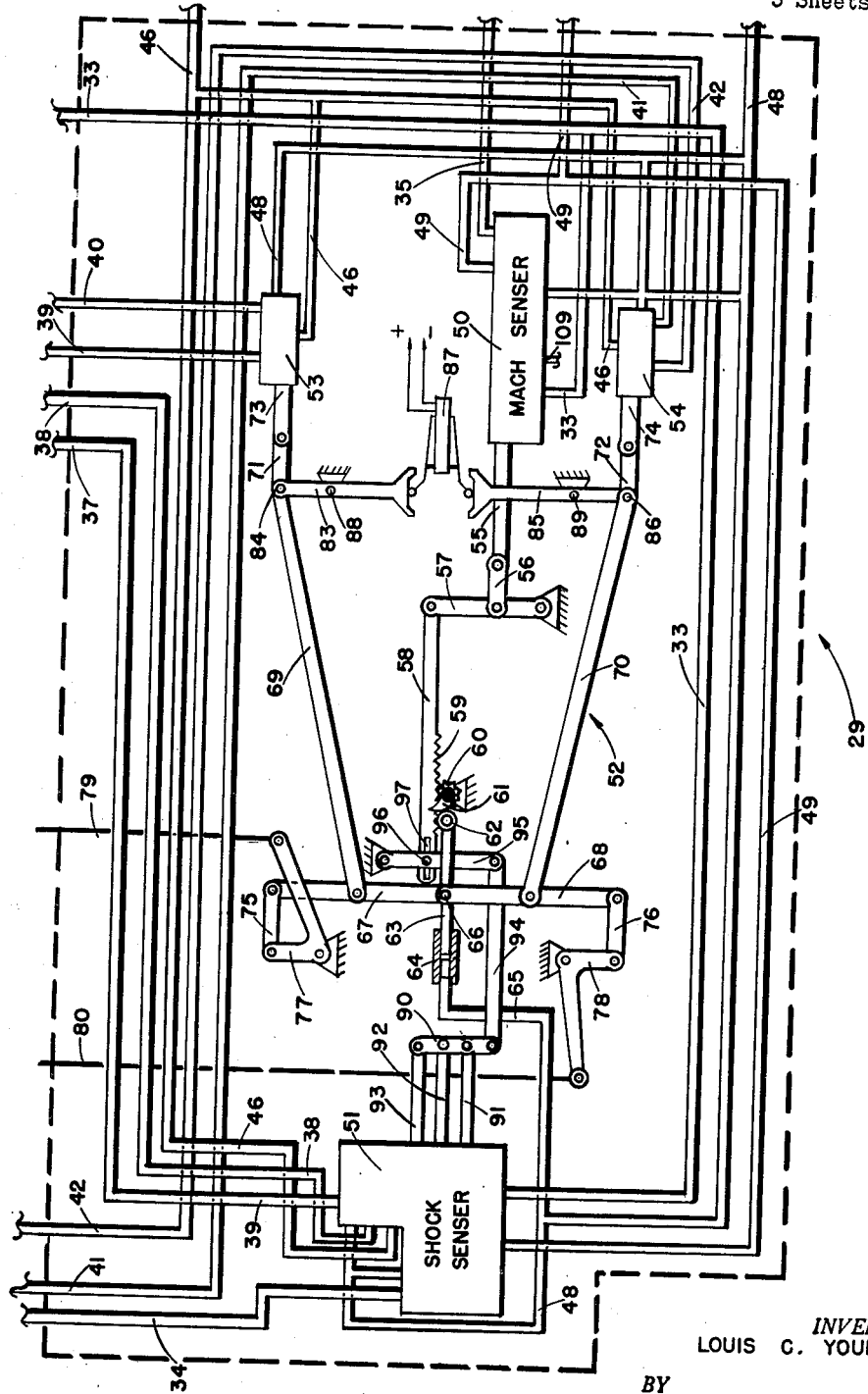
FIG. 3 is a diagrammatic view of the ramp and by-pass control system illustrating the internal linkage thereof in detail.

Control system 29 is shown in detail in FIG. 3. It comprises generally a Mach senser unit 50 for controlling the ramp positions in accordance with the ratio of air-stream total pressure to static pressure on the ramps, a shock senser unit 51 for controlling the positioning of the by-pass flaps 28, and an articulated pin-connected linkage system 52 operated by the Mach senser out-put shaft 55 for actuating the right and left ramp actuator valves 53 and 54 respectively and includes feed back or follow-up connections to the ramp actuating shafts 14 and 15.

More specifically, Mach senser output shaft 55 is longitudinally reciprocable in a linear relationship in response to changes in Mach number as felt by Mach senser 50. Shaft 55 is connected to an intermediate point on pivotally movable crank arm 57 through intermediate link 56. Rack arm 58 is pivotally connected at the outer end of crank 57 and movable in response to movement of output shaft 55. A toothed rack 59 comprising a portion of rack arm 58 meshes with a suitably supported pinion 60 and causes it to rotate in response to movement of the rack 59. Rigidly mounted on the same shaft as pinion 60 and rotatable therewith is cam 61. The surface of cam 61 has a configuration predeterminately designed to give a particular ramp angle for a particular value of Mach number in order to achieve the optimum pressure recovery at the inlet at any given speed. Cam follower 62 bears against the surface of cam 61 and moves follower rod 63, on which it is mounted, in a longitudinal direction in response to the cam movement. The rear end of follower rod 63 is reciprocally mounted in pressurized cylinder 64 to assure positive contact between follower 62 and the cam surface. Hydraulic pressure is applied to the cylinder by conduit 65 which communicates with hydraulic return line 48.

Motion of follower rod 63 is transmitted through pin-connected lever 67, push rod 69 and intermediate link 71 to the right ramp actuator valve stem 73 and the motion similarly is transmitted through lever 68, push rod 70, and intermediate link 72 to the left ramp actuator valve stem 74. All members of the linkage system are pin connected for free pivotal movement and are symmetrical about follower rod 63 so that right and left valve stems 73, 74 are simultaneously and equally actuated by the Mach senser unit in response to a change in the flight Mach value. The ramp actuator valves may be of any suitable quick-acting type, such as a spool valve, wherein pressurized hydraulic fluid may be directed to either end of the double acting ramp actuating cylinders 19, 22 through one or the other of their associated pairs of conduits 39, 40 and 41, 42, respectively with the alternate conduit of each pair being used as a return line. Preferably the working fluid is at a pressure of 3000 p.s.i. To provide an indication of when the ramps are fully closed or fully extended a warning light system may be provided. In this system a lever 83 is pin connected at one end to the ends of push rod 69 and link 71 by pin 84 and fulcrumed at 88 for pivotal movement about that point. The other end of lever 83 has a track or surface with sloping end limits or cam surfaces at each end of the track. A roller on the end of an arm of a suitable double throw switch 87, such as a microswitch, contacts the track and rides thereon. When push rod 69 is moved, switch lever 83 rotates about fulcrum 88, and when the amount of travel is sufficient to cause the switch roller to contact and ride up on either of the end limit cam surfaces, the switch is closed and a circuit may be completed to provide a visual or audible warning when the ramp is either in its innermost or outermost limit positions. Similarly when left push rod 70 is moved backwards or forwards lever 85 is caused to move about fulcrum 89, and when left ramps 12 and 13 are at their innermost or outermost positions the roller on the second arm of double-throw switch 87 will be raised by the end ramps or cams on the outer end of lever 85 into a position to complete a circuit and light a warning light on the pilot's instrument panel.

The outer ends of levers 67 and 68 are pin-connected to the ends of links 75 and 76 respectively and the latter links have their other ends pin-connected to right and left bell cranks 77 and 78 respectively. Connected to the other arm of the right bell crank is a ramp feedback or follow-up rod 79 which connects to a crank 81 rigidly mounted on the right ramp actuator shaft 14. A similar feedback rod 80 connects bell crank 78 with a crank 82 fixedly mounted on the left actuator shaft 15.

This feedback system repositions the ramp actuator valves to a neutral position after the ramp has taken the angle called for by the cam 61 in response to the flight Mach number at any given instant. In this neutral position the hydraulic supply and return lines are closed and the actuating cylinders are thereby effectively locked in position against movement.

Shock senser unit 51 includes a lever 90 which is pivotally connected to the shock senser output shaft 91, servo shaft 92, and feedback shaft 93. One end of lever 90 is pivotally connected to a push rod 94 which has its other end connected to an end of crank 95. Intermediate the ends of crank 95, a guide pin 96 is constrained to move within a slot 97 in the outer end of rack arm 58. Movement of lever 90 is thus limited by the amount of movement permitted guide pin 96 in slot 97. By proper dimensioning of the linkage and slot system the shock senser unit 51 may be rendered inoperative below a predetermined minimum Mach number below which it may not be desirable to operate the by-pass flaps.

Figure 4:
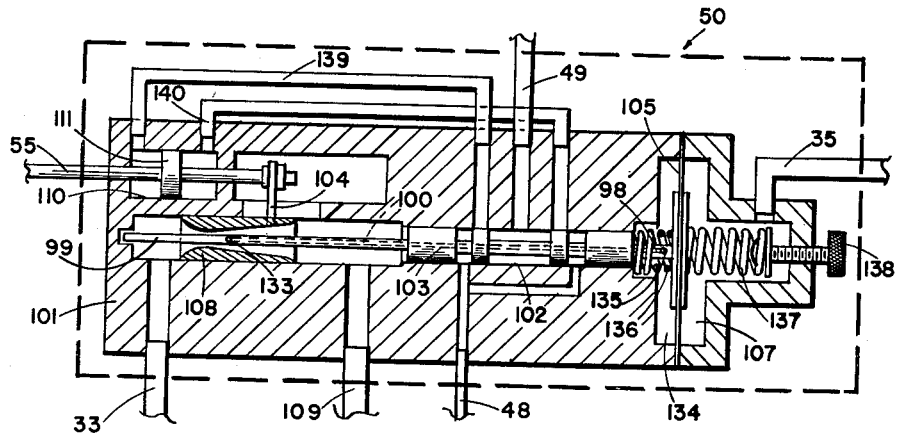
FIG. 4 is a diagrammatic sectional view of the Mach senser unit forming part of the control system.

The Mach senser unit 50 performs the function of controlling the flow of hydraulic fluid to the left and right ramp actuating cylinders and is not a part of the invention per se. As schematically illustrated in FIG. 4 the unit comprises a block 101 having a bore 102 with a spool type valve 103 slidably positioned therein. A cavity at one end of block 101 is divided into two chambers 107 and 134 by a flexible diaphragm 105 which is fixedly connected to valve spool 103 by valve stem extension 98. The diaphragm is spring loaded on each side by means of the coil compression springs 136 and 137 which are initially adjustably stressed the proper amount by means of thumbscrew 138. Outer chamber 107 is in communication with the ambient static pressure by means of conduit 35 and pressure pickup 36. At the other end of the valve spool a venturi 108 is slidably positioned in bore 102. Total pressure conduit 33 communicates with bore 102 upstream of the venturi, and the air carried thereby flows through the venturi and is discharged through exhaust conduit 109. Rod 99, axially concentric with valve spool 103, extends from the left end of the valve spool axially through the throat of venturi 108. A passageway 100 extends axially through this rod from a connecting port 133 located in the surface of the rod within the venturi at a location downstream of the venturi throat. Passageway 100 also extends axially through the spool valve and into extension 98 where it communicates with chamber 134 through a port 135. The static pressure existing in the venturi at port 133 is thus communicated to chamber 134. This static pressure varies with the flow rate and the distance of port 133 from the throat of the venturi. The differential pressure created by this static pressure at port 133 acting on one side of diaphragm 105 in chamber 134 and by the ambient static pressure acting on the other side of the diaphragm in chamber 107 causes movement of the valve spool in a manner to establish communication between pressurized hydraulic fluid conduit 49 and one of the two hydraulic conduits 139, 140 leading to and from the senser unit power cylinder 110. Double acting piston 111 is reciprocable in cylinder 110 in response to the hydraulic pressure to drive output shaft 55 in a direction dependent on whether the Mach number of the aircraft is increasing or decreasing. Venturi 108 is rigidly attached to the inner end of output shaft 55 by member 104 and is slidably repositioned by the movement of the output shaft to a new position in a manner to equalize the pressures on each side of diaphragm 105 and move spool valve 103 back to its initial neutral position wherein the hydraulic supply and return lines are blocked off by the valve spool lands. This follow-up system provides for step adjustment of the ramps in accordance with a change in Mach number and a return to neutral of the sensing device 50 when the required ramp angle is achieved.

Figure 5:
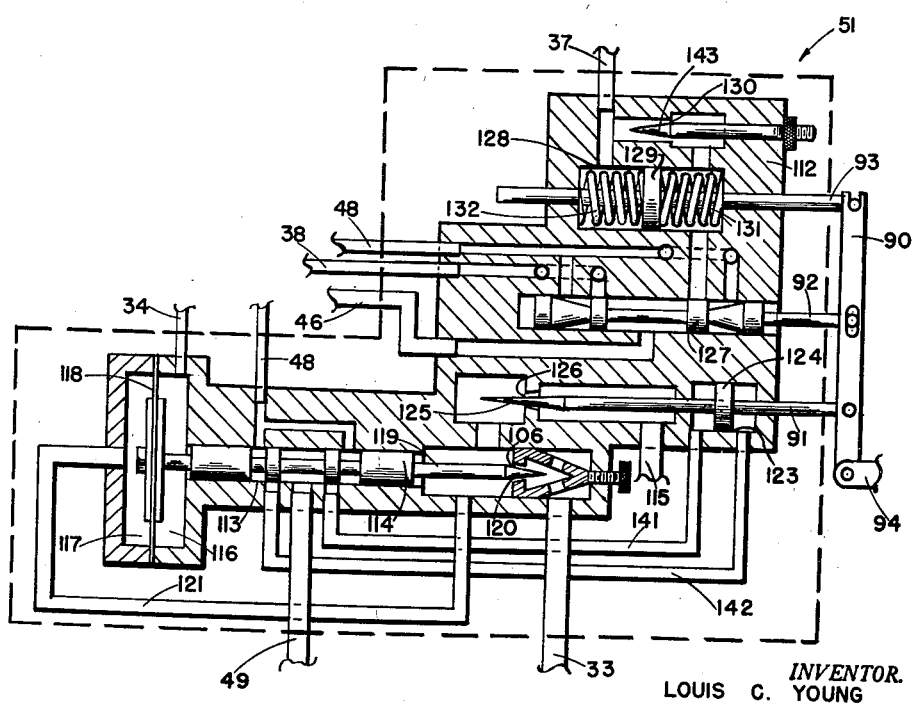
FIG. 5 is a diagrammatic sectional view of the shock senser portion of the control system.

The shock senser and computer unit 51 performs the function of metering hydraulic fluid to the by-pass flap opening cylinders 26 in accordance with the pressure difference between the total pressure behind a normal shock, as measured at a remote point, and a shock pressure as measured across the inlet normal shock wave front. The shock pressure is measured by means of a probe or rake having two or more pickup taps spaced across the shock front and communicating with the flow in a manner to sense the static pressure through the shock front. The shock pressure will then reflect the average of the individual pressures at the separate pickups and will give an indication of the position of the normal shock wave; since the shock pressure will change if the normal shock front moves forwardly or rearwardly from its normal predetermined position between the outer pickup points. A slotted probe may also be used to measure the pressure across the shock front to give a more accurate integration of the static pressures across the normal shock wave. The shock senser forms no part of this invention per se, and as schematically illustrated in FIG. 5, the unit comprises a block 112 having a bore 113 with a spool type valve 114 therein. A cavity at one end of block 112 is divided into two chambers 116 and 117 by a flexible diaphragm 118 which is fixedly connected to the valve spool 114. At the other end of bore 113 a valve stem extension 119 has a needle valve portion 120 on the end thereof controlling a calibrated orifice 106 which meters the total pressure air taken in by the total pressure pickup 32 and conducted to the control system by conduit 33. This total pressure is communicated to chamber 117 by conduit 121 while chamber 116 communicates with the shock pressure pickup probe 30 through conduit 34. Any pressure differential existing across the diaphragm causes the diaphragm and attached spool valve to be displaced, thereby admitting pressurized hydraulic fluid to one end or the other of power cylinder 123 through conduit 141 or 142, depending on the direction of movement of the diaphragm and attached valve spool. A piston 124 is reciprocable in cylinder 123 in response to the hydraulic pressure to move output shaft 91. One end of shaft 91 is pin connected to lever 90 while the other end forms a needle valve 125 for controlling the bleeding of the total pressure air to atmosphere at 115 through a second calibrated orifice 126 in response to the position of the power piston 124. Orifices 106 and 126 are calibrated to provide a fixed ratio of the airstream total pressure to the shock pressure. At this ratio, valve spool 114 is in a neutral position preventing movement of piston 124 in the power cylinder 123. When this ratio is varied by a change in the shock pressure due to displacement of the normal shock or by a change in the total pressure, valve spool 114 is displaced and piston 124 actuated. Movement of output shaft 91 repositions needle valve 125 relative to orifice 126 in a manner to oppose the change from the design pressure differential and thereby acts to reposition valve spool 114 in its neutral position closing the hydraulic supply and return ports. The control action is thus by a series of successive steps with successive changes in shock or total pressure.

The movement of output shaft 91 is transmitted through lever 90 to servo shaft 92 which operates a servo valve 127 of the spool type for controlling the admission and return of pressurized hydraulic fluid to and from the by-pass actuator cylinders 26 through conduits 37 and 38. Conduit 37 includes a chamber 128 with a piston 129 slidable therein and rigidly connected to feedback shaft 93, which shaft in turn is pin-connected to the end of lever 90. Piston 129 is normally centered in chamber 128 by two similar opposed springs 131 and 132, one acting on each side of the piston. An orifice-type by-pass 130 adjustably controlled by needle valve 143 interconnects the opposite ends of chamber 128.

When servo valve 127 admits pressurized hydraulic fluid into one end of chamber 128, the additional pressure forces the spring loaded piston 129 toward the opposite end of the chamber, thereby pressurizing the fluid trapped between the opposite side of piston 129 and the pistons in by-pass actuator cylinders 26, thereby moving the latter pistons to open by-pass doors 28. Upon return of servo valve 127 to the neutral position the hydraulic pressure supply and return lines are closed off and the pressure on opposite sides of piston 129 becomes equalized through by-pass orifice 130, and the piston is returned to its central neutral position by the springs thus returning shaft 93 and the connected end of lever 90 to their initial starting position. If servo 127 is moved in an opposite direction, pressurized fluid will be supplied through conduit 38 to cylinders 26 to close the by-pass doors. The fluid trapped between pistons 129 and the by-pass actuators acts to move piston 129 and shaft 93 toward the right until the pressure becomes equalized through the by-pass orifice 130 when the piston and shaft will be returned to a neutral central position.

Figure 1:
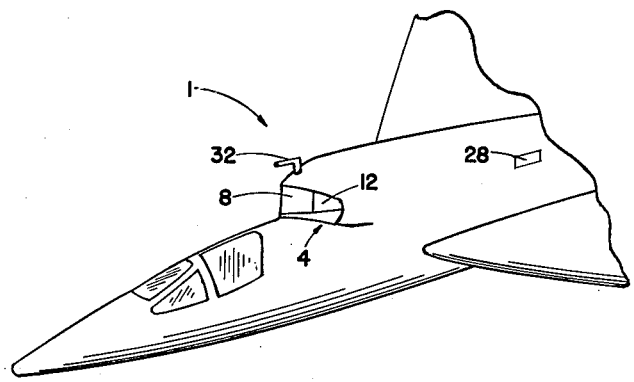
FIG. 1 is a fragmentary perspective view of an airplane incorporating the variable inlet-ramp and by-pass system of this invention.
Figure 6:
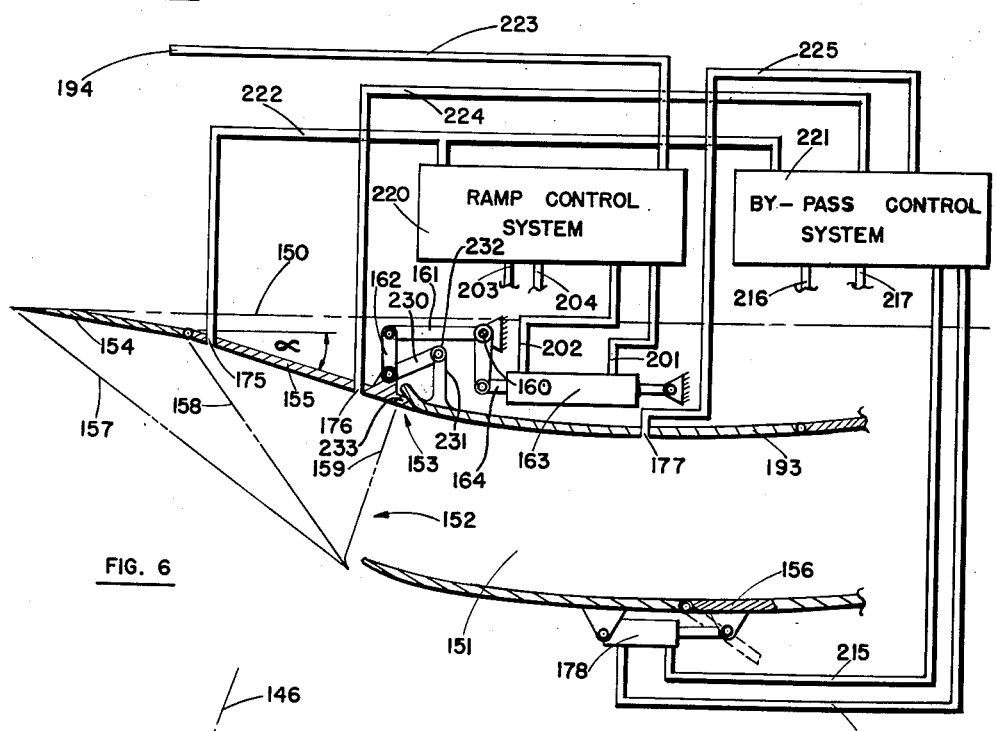
FIG. 6 is a diagrammatic view, partly in section, of a second embodiment of this invention and a simplified actuating and control system therefor.

FIG. 6 schematically illustrates a second embodiment of the invention as applied to an inlet having a single opening with a ramp, designated generally at 153, forming one surface of the inlet duct for two dimensional control of the entering air. An aircraft or missile body 150 has an engine air duct 151 with a ram air inlet 152. Body 150 may be either the fuselage or wing of the aircraft or missile. By-pass doors 156 form a movable portion of the duct enclosure rearwardly of the inlet ramp but forwardly of the engine.

Ramp 153 comprises a fixed forward ramp 154 having a wedge angle of approximately 8 degrees and a variable second ramp 155 that can be adjusted to an angle of approximately 20 degrees or in accordance with any particular design flight conditions expected to be encountered. The variable compression ramp 155 and diffuser ramp 193 are hinged similarly to the ramps of the first embodiment and present a substantially smooth, faired surface to the airstream. A ramp actuation shaft 160 suitably mounted for rotational movement is connected to variable ramp 155 by means of a bell crank 161 fixedly mounted on shaft 160 and a pin-connected link 162 joining the end of one arm of the crank and the variable ramp wall. The other arm of bell crank 161 is pivotally connected to piston rod 164 reciprocably extending from ramp actuator cylinder 163. Arm 230 is rigidly attached to compression ramp 155 while arm 231 is rigidly attached to diffuser ramp 193. The inner ends of arms 230 and 231 are pin connected at 232. Thus, upon movement of actuator 163 to effect inward or outward movement of compression ramp 155, diffuser ramp 193 is constrained to follow with ramp 193 sliding relative to ramp 155 at slide joint 233. Three static pressure sensing tubes or inlets are located on the ramp wall, the forward tube 175 being located near the front of variable ramp 155 and sensing a static pressure $P_A$, an intermediate tube 176 located near the rear of ramp 155 and sensing a static pressure $P_B$, and a rear tube 177 located a spaced distance rearwardly of tube 176 and sensing a static pressure $P_C$.

Control of boundary layer air is important to efficient operation of the inlet system not only from the standpoint of drag reduction but also in order to obtain true readings of static pressure on the ramp. For this reason the ramps should have a boundary layer air bleed-off system (not shown) comprising ramp surfaces having a suitable porosity and an eduction means for continuously removing the boundary layer air. It is particularly important that pressure tube 176 be located in a region of high ramp porosity to insure against pressure "feedback" through the boundary layer with consequent erroneous pressure measurements. It is estimated that for an installation of the type of FIG. 6 the porous ramp bleed air will be about 3 percent of the engine air for critical mass flow operation at Mach 2.0.

Oblique shock waves 157 and 157 are created by the leading edge of fixed ramp 154 and the "corner" at the hinged junction of the fixed ramp and the variable ramp 155 respectively. The normal shock wave at the inlet is designated by numeral 159. To achieve the optimum pressure recovery, the angle of the variable ramp is adjusted to maintain a constant ratio of the static pressure on the variable ramp to the total pressure measured behind a normal shock at a remote location by a probe 194. To prevent hunting of the ramp control system, a deadband area having limits above and below the desired constant ratio of static pressure to total pressure may advantageously be incorporated into the control system. If the desired pressure ratio is less than the lower limit, the control will cause the angle α of the variable ramp to increase. If the pressure ratio exceeds the upper limit, the control will decrease the angle of the variable ramp.

Figure 8:
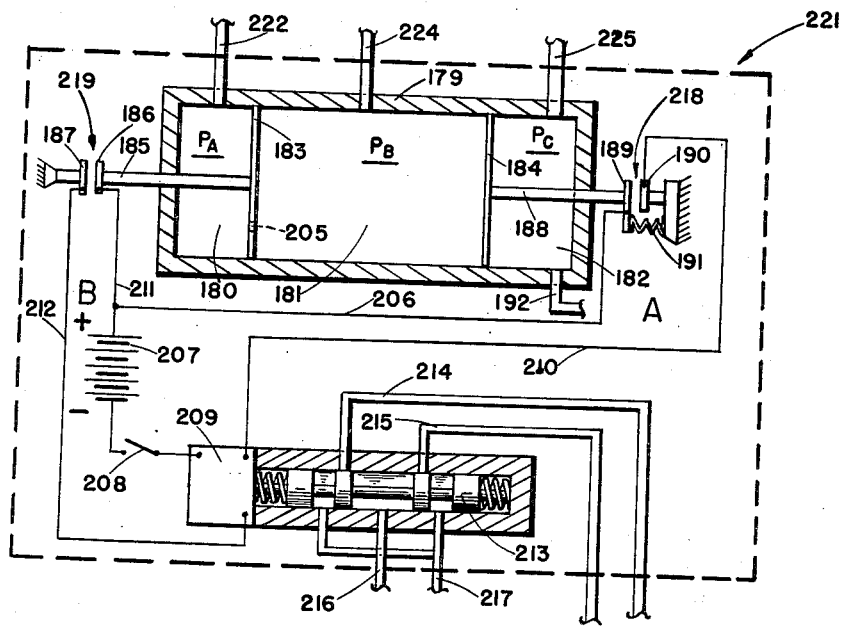
FIG. 8 is a diagrammatic view, partly in section, of a system for controlling the by-pass portion of the second embodiment of this invention.
Figure 7:
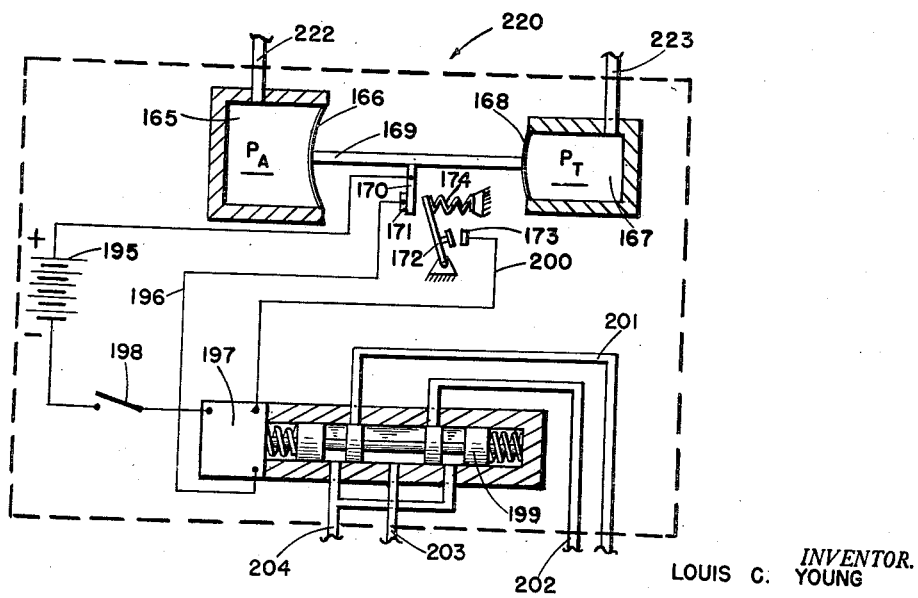
FIG. 7 is a diagrammatic view, partly in section, of a system for controlling the variable ramp portion of the second embodiment of this invention.

While the single inlet system of FIG. 6 is also adaptable to being controlled by a mechanical-hydraulic control system as shown in connection with the first described embodiment, electrical control systems therefore are shown in FIGS. 7 and 8 and described herein.

A simplified form of a ramp angle control system 220 for the inlet of FIG. 6 is schematically illustrated in FIG. 7. This control will maintain the pressure recovery across the shock system within one percent of the optimum value for a range of inlet angles of attack of six degrees. A chamber 165 communicating with ramp static pressure $P_A$ through conduit 222 and a chamber 167 communicating by means of conduit 223 with the remote total pressure $P_T$ behind a normal shock have diaphragms 166 and 168, respectively, forming adjacent walls of the chambers. The ratio of the area of diaphragm 168 with respect to the area of diaphragm 166 is the same as the ratio of the ramp static pressure to total pressure which is to be maintained by the control system. The diaphragms are interconnected by a rigid rod 169 bearing a contact arm 170. Depending on the ratio of pressures in the respective chambers, arm 170 will either make contact with contact 171 and complete a circuit to increase the ramp angle α, or it will contact one end of pivoted spring biased contact arm 172 and rotate the contact arm against the biasing spring 174 until arm 172 abuts contact 173 and completes a circuit to decrease the ramp angle.

These circuits comprise an electrical energy source 195 connected between common contact arm 170 and a terminal common to the two oppositely wound coils on double-acting solenoid 197. This leg is common to each of the circuits connecting the diaphragm-operated contact switches and includes a manual switch 198. A circuit for increasing the ramp angle can be completed through lead 196 which connects contact 171 and the end of one of the coils of solenoid 197; while a circuit for decreasing the ramp angle can be completed through lead 200 which connects contact 173 and the end of the oppositely wound coil in double-acting solenoid 197. The stem of a spool-type valve 199 is rigidly connected to the solenoid core for actuation of the valve spool by the solenoid. This valve spool is spring biased to a central neutral position, when not acted on by the solenoid, to close off the ramp actuator hydraulic lines 201 and 202 which are alternatively connected to the pressurized hydraulic fluid supply and return lines 203 and 204, respectively, of a conventional closed hydraulic system which includes a reservoir, pump, and accumulator, none of which are shown.

In operation, an unbalancing of the coupled diaphragms, due to a change in the ratio of ramp static pressure to total pressure, causes contact to be made between one set of contacts 170, 171 or 172, 173 depending on the direction of unbalance of the chamber pressures. If switch 198 is closed a circuit is then completed from energy source 195 through one of the coils of the solenoid and back to the energy source. Energization of the solenoid causes longitudinal movement of the valve spool in a direction to establish communication between supply line 203 and line 201 and between return line 204 and line 202 to cause actuator piston rod 164 to extend and decrease the ramp angle. Movement of the coupled diaphragms in the opposite direction completes a circuit through the other set of contacts and through the oppositely wound coil of the double acting solenoid to cause longitudinal movement of the valve spool in an opposite direction to establish communication between supply line 203 and line 202 and between return line 204 and line 201 to cause piston rod 164 to retract and increase the ramp angle.

As previously pointed out, the maximum net propulsive effort of the engine as well as good inlet stability require matching of the power plant air demand and the air supply of the inlet. In view of the wide range of possible inlet mass flow ratios and possible variations in engine air demand an engine by-pass system is very desirable for achieving optimum dynamic flow conditions. While normally very little by-pass area will be required at design angles of attack, rapid changes in aircraft attitude or engine air demand will induce inlet instability if no provisions are made for by-passing the excess air supplied by the inlet.

The by-pass control system 221, in the embodiment of FIG. 6, senses the pressure differences between $P_A$ on the variable ramp and $P_B$ and $P_C$ and adjusts the by-pass airflow to maintain the normal shock between tubes 176 and 177. The pressure tubes 176 and 177 are located at the limits of the desired range of normal shock movement and communicate with the by-pass control system through conduits 224 and 225, respectively; while forward pressure tube 175 communicates with the control system through conduit 222. The tubes can be located on the ramp as shown in FIG. 6 or on the inlet cowl. Under normal critical operating conditions the normal shock front is located between tubes 176 and 177 and pressures $P_A$ and $P_B$ are approximately equal and less than $P_C$. $P_C$ will be high due to the pressure rise across the normal shock. During subcritical inlet operation the normal shock may move forward of tube 176 and $P_A$ then is less than $P_B$ while $P_B$ approaches $P_C$ and the control will open the by-pass to increase the inlet mass flow and move the shock aft of tube 176. If the inlet should operate super-critically so that the normal shock would be swallowed into the duct aft of tube 177, the pressures $P_A$, $P_B$, and $P_C$ will be approximately equal and the control will close the by-pass to move the shock front forward again.

A simplified form of a by-pass control 221 is schematically illustrated in FIG. 8 wherein a container 179 is divided into a left chamber 180, an intermediate chamber 181, and a right chamber 182 by dividing members 183 and 184. These dividing members may be flexible diaphragms or reciprocable pistons. Left dividing member 183 has a rigid rod or piston arm 185 connected thereto with a contact 186 on the end of the arm for making contact with a fixed contact 187 upon outward movement of the attached dividing member 183. Right dividing member 184 has a similar rod 188 with a contact 189 thereon for contacting fixed contact 190. Contact 189 in this case is biased to a closed position by spring 191 when $P_C$ is below a minimum value. Chambers 180 and 181 communicate through a restricted orifice 205 in dividing member 183. Static pressure $P_A$ is communicated to left chamber 180 through conduit 222. Static pressure $P_B$ is communicated to central chamber 181 through conduit 224, and static pressure $P_C$ is communicated to right chamber 182 through conduit 225. Chamber 182 also communicates through vent line 192 to ambient atmospheric pressure.

In operation when the inlet conditions are near critical, $P_A$ will be substantially equal to $P_B$ and $P_B$ will be less than $P_C$. Under these conditions the control device will be in a balanced condition and both the left and right switches will be open and no control signal will be transmitted. Spring biased contact 189 will be held open by the pressure differential between $P_C$ and $P_B$ which acts on movable member 184. Under super critical conditions, however, $P_A$, $P_B$ and $P_C$ are all substantially equal and the left switch will remain open while the right switch will close due to spring 191 and transmit a "close by-pass" signal. Under sub-critical conditions of operation, $P_A$ is less than $P_B$ and $P_B$ is substantially the same as $P_C$. Under this set of entrance conditions both the left and right switches will close and transmit an "open by-pass" signal.

Circuit A for closing the by-pass doors comprises, in addition to the right switch 218 having contacts 189 and 190, a lead 296, electrical energy source 207, manually operable switch 208, differential double-acting solenoid 209 and a lead 210. Circuit B for opening the by-pass doors comprises in addition to the left switch 219 having contacts 185 and 186 a lead 211, energy source 207, manual switch 208, differential double-acting solenoid 209 and lead 212. The stem of a spool type valve 213 is rigidly connected to the solenoid core for actuation of the valve spool by the solenoid. The valve spool is spring biased to a central neutral position, to close off the by-pass actuator hydraulic lines 214 and 215, when not displaced by the action of the solenoid. When the solenoid is actuated, by closing of either the left or right switch, the by-pass actuator hydraulic lines 214 and 215 are connected to one or the other of pressurized hydraulic fluid supply and return lines 216 and 217, respectively, of a conventional closed hydraulic system which includes a reservoir, pump and accumulator, none of which are shown. The differentially-wound double-acting solenoid is so constructed that although the right switch 218 may be closed, circuit A completed, and its associated solenoid coil energized to close the by-pass, the stronger overriding opposed solenoid coil of circuit B will cause valve 213 to move to open the by-pass when left switch 219 closes.

In operation therefore when inlet conditions are near critical and the normal shock wave is located between static pressure sensing tubes 176 and 177, pressure $P_A$ in chamber 180 is equal to pressure $P_B$ in chamber 181 and $P_B$ is less than pressure $P_C$ in chamber 182. For this set of conditions both left switch 219 and right switch 218 are open and the valve spool remains centered, shutting off communication between the by-pass actuator lines 214 and 215 and the hydraulic supply and return lines 216 and 217 respectively. Under super-critical conditions of inlet operation, when the normal shock front is swallowed into the duct behind tube 177, pressures $P_A$, $P_B$, and $P_C$ will be approximately equal and right switch 218 will close. This completes circuit A and energizes solenoid 209 to actuate the valve spool in a manner to effect communication between by-pass hydraulic lines 214 and 215 and supply and return lines 216 and 217 in a manner to cause the by-pass actuators to close the by-pass doors. When conditions in the inlet are sub-critical, $P_A$ will be less than $P_B$ which, in turn, is equal to $P_C$. Both switches 218 and 219 will close under these conditions but circuit B will control, since it has a stronger solenoid coil, to actuate the valve spool in a manner to cause the by-pass actuators to open the by-pass doors.

The by-pass control may advantageously also incorporate a jog circuit to adjust the by-pass area by small increments and the by-pass opening rate should be greater than the closing rate to insure opening the by-pass in the event of a cycling movement of the shock front which may occur during incipient inlet instability or "buzz" operation. The by-pass control should also override the ramp angle control at the limits of the by-pass movement. If the by-pass is fully closed and the normal shock is located aft of tube 177, the ramp angle should be decreased; if the by-pass is fully open and the normal shock is forward of tube 176, the ramp angle should be increased.

To detect incipient unstable conditions in the inlet systems as described, a "buzz" senser device may be advantageously used. Such a device should be capable of operating the necessary circuitry to allow the by-pass doors to be opened fully to increase the mass flow as well as retracting the variable ramp or ramps to their innermost position.

From the above description it will be seen that this invention provides a unique two-dimensional supersonic ram-air inlet system that enables a jet-type engine to efficiently realize its maximum propulsive effort at any particular set of air inlet conditions. This is accomplished by automatic proportioning of the inlet mass air flow between the engine and a by-pass device, so that spillage drag at the inlet will be minimized or eliminated, and by achieving the maximum possible pressure recovery from the supersonic airstream by means of a wedge having a variable ramp compression surface. The mass air flow supplied by a variable ramp type inlet and the amount of pressure recovery attained thereby are interrelated and are both functions of the flight Mach number, the ramp angle, and the effective angle of attack of the inlet. With the ramp angle adjusted in conformance with a given inlet attitude and Mach number to produce the optimum pressure recovery in the inlet supersonic diffuser, the inlet air mass flow rate may under certain operating conditions be capable of supplying more air than the engine can use. If this air is not diverted in some manner, the normal shock front may move out in front of the inlet and become detached from the lip of the inlet. This will cause a spilling over around the edges of the inlet lip of some of the air that would otherwise have entered the duct and may upset the aerodynamic stability of the inlet. This spillage at supersonic speeds will cause an increase in drag. The by-pass mechanism allows substantially all of the air within the capture area of the inlet to enter the duct by positioning the normal shock wave within the entrance of the inlet and causes the excess air to be discharged overboard downstream of the inlet so as to stabilize and match the inlet-engine mass air flow at the optimum ramp angle for achieving maximum pressure recovery.

In this manner the system of this invention supplies the correct amount or air required by the engine for efficient operation and achieves the optimum pressure recovery while assisting the propulsive effort of the engine by reducing the inlet spillage drag.

While particular embodiments of this invention have been illustrated and described herein, it will be apparent that various other changes and modifications may be made in the construction and arrangement of the various parts without departing from the spirit and scope of this invention in its broader aspects or as defined in the following claims.

I claim:

1. In combination with a supersonic aircraft having a jet-type propulsive engine, an engine air inlet and a duct connecting the inlet and the engine; means for sensing the inlet aerodynamic conditions; by-pass door means in said duct for discharging the excess air of the inlet relative to the engine air demand; means responsive to said sensing means for controlling the discharge means to obtain efficient matching of the inlet mass air flow and the engine mass air demand and to minimize inlet spillage drag and insure inlet stability; angularly disposed variable ramp means at said inlet for maintaining the optimum pressure recovery of the inlet air; and means responsive to said sensing means for varying the angularity of said variable ramp means to maintain a constant ratio of the static pressure on the variable ramp to the airstream total pressure.

2. The combination of a supersonic aircraft having a jet-type propulsive engine, an engine air inlet and a duct connecting the inlet and the engine as set forth in claim 1 wherein the means responsive to said sensing means further controls said discharge means to maintain the inlet normal shock wave within predetermined limits at the inlet to prevent inlet instability.

3. In combination with a supersonic vehicle having a propulsive engine, a duct connected to the engine and having a ram-air inlet for supplying air to the engine with a normal shock wave at the inlet, laterally movable ramp means angularly disposed to the airstream flow in said duct; means for sensing the static pressure on said ramp; means for sensing the airstream total pressure at a remote location; means for decreasing the variable ramp angle upon an increase in the ratio of said static pressure to said total pressure above a predetermined limit and for increasing the ramp angle upon a decrease in the ratio of the static pressure to total pressure below a predetermined limit; means for sensing the static pressure increase across the inlet normal shock wave; and means responsive to said normal shock wave sensing means for discharging the excess air capacity of the inlet relative to the engine air demand.

4. The combination of a supersonic vehicle having a propulsive engine, a duct connected to the engine and having a ram-air inlet for supplying air to the engine with a normal shock wave at the inlet as set forth in claim 3 wherein said means responsive to said normal shock wave sensing means maintains the inlet normal shock within predetermined limits at the inlet to prevent instability in the duct.

5. In combination with a supersonic aircraft, missile or the like having a propulsive engine and a duct connected to said engine and having a ram-air inlet for supplying air to the engine with a normal shock wave at the inlet; variable ramp means angularly disposed to the airstream flow; means for sensing the ramp static pressures, $P_A$ at a forward point, $P_B$ at an intermediate point, and $P_C$ at a rearward point; means for sensing the airstream total pressure $P_T$ at a remote undisturbed location; means for decreasing the variable ramp angle when the ratio of $P_A/P_T$ exceeds a predetermined value and for increasing the ramp angle when the ratio of $P_A/P_T$ is less than a predetermined value; and means responsive to said static pressures $P_A$, $P_B$, and $P_C$ for by-passing the excess air capacity of the inlet; said by-pass means being moved to an open position when $P_A$ is less than $P_B$ and $P_B$ is less than $P_C$, said by-pass means being moved to a closed position when $P_A$, $P_B$, and $P_C$ are substantially equal, and said by-pass means being in a neutral or unchanged position when $P_A$ equals $P_B$ and $P_B$ is less than $P_C$.

References Cited in the file of this patent

UNITED STATES PATENTS

| | | |
|---|---|---|
| 2,540,594 | Price | Feb. 6, 1951 |
| 2,551,470 | Smith | May 1, 1951 |
| 2,638,738 | Salter | May 19, 1953 |
| 2,767,579 | Faget | Oct. 23, 1956 |
| 2,804,084 | Greenland | Aug. 27, 1957 |
| 2,840,322 | Griffith | June 25, 1958 |
| 2,950,594 | Mitrovich | Aug. 30, 1960 |

FOREIGN PATENTS

| | | |
|---|---|---|
| 614,548 | Great Britain | Dec. 17, 1948 |
| 709,300 | Great Britain | May 19, 1954 |
| 140,860 | Sweden | June 16, 1953 |